(12) United States Patent
Hofmann

(10) Patent No.: US 9,284,205 B2
(45) Date of Patent: Mar. 15, 2016

(54) APPARATUS PROVIDING SOFTENED MAKEUP WATER FOR COOLING SYSTEM

(71) Applicant: Donald S. Hofmann, Palm Beach Gardens, FL (US)

(72) Inventor: Donald S. Hofmann, Palm Beach Gardens, FL (US)

( * ) Notice: Subject to any disclaimer, the term of this patent is extended or adjusted under 35 U.S.C. 154(b) by 162 days.

(21) Appl. No.: 14/140,238

(22) Filed: Dec. 24, 2013

(65) Prior Publication Data

US 2015/0175459 A1 Jun. 25, 2015

(51) Int. Cl.
C02F 5/00 (2006.01)
C02F 103/02 (2006.01)

(52) U.S. Cl.
CPC .............. *C02F 5/00* (2013.01); *C02F 2103/023* (2013.01); *Y10T 137/034* (2015.04); *Y10T 137/0318* (2015.04); *Y10T 137/2499* (2015.04); *Y10T 137/2514* (2015.04)

(58) Field of Classification Search
CPC ........................................................ C02F 5/00
USPC .......................................... 210/739, DIG. 11
See application file for complete search history.

(56) References Cited

U.S. PATENT DOCUMENTS

| | | | |
|---|---|---|---|
| 3,805,880 A | 4/1974 | Lawlar | |
| 4,276,180 A * | 6/1981 | Matson | ......................... 210/683 |
| 4,532,045 A | 7/1985 | Littmann | |
| 4,563,284 A | 1/1986 | Amjad | |
| 4,813,240 A * | 3/1989 | Hon | ................. 62/171 |
| 4,931,187 A | 6/1990 | Derham et al. | |
| 5,057,229 A | 10/1991 | Schulenburg | |
| 5,342,510 A | 8/1994 | Eden et al. | |
| 5,663,489 A | 9/1997 | Thungstrom et al. | |
| 5,730,879 A | 3/1998 | Wilding et al. | |
| 5,855,791 A | 1/1999 | Hays et al. | |
| 6,012,708 A | 1/2000 | Nagano | |
| 6,315,909 B1 | 11/2001 | Hoots et al. | |
| 6,746,609 B2 | 6/2004 | Stander | |
| 7,157,008 B2 | 1/2007 | Owens | |
| 7,179,384 B2 | 2/2007 | Moriarty et al. | |
| 7,497,953 B2 | 3/2009 | Dart et al. | |
| 7,595,000 B2 | 9/2009 | Keister | |
| 7,632,412 B2 | 12/2009 | Johnson et al. | |
| 7,699,991 B2 | 4/2010 | Owens | |
| 8,088,287 B2 | 1/2012 | Dart et al. | |
| 2003/0127391 A1 | 7/2003 | Craft, Sr. et al. | |

(Continued)

FOREIGN PATENT DOCUMENTS

CA          1081604        7/1980

*Primary Examiner* — Robert A Hopkins
(74) *Attorney, Agent, or Firm* — Price Heneveld LLP

(57) ABSTRACT

An apparatus introduces partially-purified, softened makeup water into an open recirculating cooling system by injecting proportionated softened makeup water into a secondary side system (such as for filtering the system water) and connected to its primary recirculating system. Proportional unsoftened makeup water is introduced through the secondary side system lines. In particular, the present apparatus and method includes controlling proportional additions (via batch or continuously) of softened and unsoftened makeup water based on cycles of concentration of the system water, and based on characteristics (e.g. conductivity) of the unsoftened makeup water. For example, the present innovation allows the water softener equipment to be placed inside the building where components are easier to install, service, and maintain, while still resulting in optimal control for purposes of minimizing total makeup water required. This results in a more environmentally friendly system with less water usage and installation/maintenance savings.

12 Claims, 3 Drawing Sheets

(56) References Cited

U.S. PATENT DOCUMENTS

2004/0254682 A1 12/2004 Kast
2010/0025333 A1 2/2010 Owens
2012/0048715 A1 3/2012 James

* cited by examiner

APPARATUS PROVIDING SOFTENED MAKEUP WATER FOR COOLING SYSTEM

BACKGROUND

The present invention relates to large cooling systems, such as for buildings and large equipment, and more particularly relates to an apparatus providing proportioned softened makeup water for a cooling system where concentration of impurities in recirculating water can cause system fouling. The present invention also relates to fail-safe methods of controlling pretreatment processes, including use of a conductivity sensor that monitors low conductivity as a function of system control. However, the present innovation is not limited to only the above noted applications, and instead it is contemplated that it will work for many water and fluid treatment systems, including ones that use demineralized water, reverse osmosis product water, nano-filtrated water, and other pretreatment processes (e.g. precipitation processes to remove silica from water).

Many cooling systems are water-cooled by means of recirculated water that partially evaporates, such as will occur when passing over a cooling tower during the process. The evaporated water leaves mineral free, but minerals and other impurities in the water are left behind in the recirculated cooling water. The evaporated water is replaced from the cooling system makeup source, which typically introduces more minerals into the system. Unless separate action is taken, the mineral concentration in the cooling water will continue to increase, until the solubility limit of the minerals is exceeded. At this point, precipitation occurs, and scaling or other fouling of the system may result. To prevent this, cooling water is intentionally removed from the system. This elimination is referred to as blowdown (or sometimes "bleed-off").

The degree of concentration of the cooling water is typically expressed as a multiple of the concentration of the makeup source, and is called the "cycles of concentration". There is a mathematical relationship between the cycles of concentration ("c"), evaporation ("E"), blowdown ("B") and makeup ("M"). This relationship is described by the following two equations:

$$M=E+B \quad (1)$$

$$B=E/(c-1) \quad (2)$$

As seen in the above equations, as the value of c increases, the value of blowdown B is reduced. Also, as the blowdown B is reduced, the total makeup requirement for the cooling system is reduced.

By way of example: Consider the use of a 1000 ton chiller with a cooling tower. Assuming that the system is utilized at full capacity, about 30 gallons per minute (gpm) of evaporation will nominally be required to provide the designed heat rejection. If this system is operated at three cycles of concentration, then an additional 15 gpm (B=E/(c−1) or 50% of the evaporation, will be required to maintain this concentration. The total makeup would therefore be 45 gpm (30 gpm+15 gpm). However, as shown in the chart below, the blowdown (and makeup) requirement changes with the increase in cycles of concentration:

| Cycles | 3 | 4 | 5 | 6 | 7 |
|---|---|---|---|---|---|
| E | 30 | 30 | 30 | 30 | 30 |
| B | 15 | 10 | 7.5 | 6 | 5 |
| M | 45 | 40 | 37.5 | 36 | 35 |

In the above example, the ability to increase the allowable cycles of concentration from three to six cycles yields a savings of 9 gpm, or 12,960 gallons/day (gpd), or 4,730,400 gallons per year. With the rising costs of water and sewerage charges, this water savings can save over $30,000 annually.

The upper limit of cycles of concentration is often limited by the makeup source quality and the saturation limits of its constituent minerals. For example, water hardness (especially calcium compounds) must often be limited in the recirculated water to prevent precipitation (and concomitant scaling). Using the example above, let us assume that the cycles of concentration in an evaporative cooling system were limited by the saturation limit of hardness in the cooling water, and that the concentration of total hardness is limited to 500 ppm. In this example, cycles of concentration would necessarily be limited to 500/150 or 3.33 cycles. And, a priori, the required blowdown rate would be 0.43 (i.e. 1/(3.33−1)) of evaporation.

One known water saving method is to partially purify the makeup water, effectively reducing the mineral loading in the cooling water and allowing a greater cycles of concentration to be achieved at the same given saturation limit.

A water softener removes the hardness from water, usually by means of ion exchange. In our example, the makeup water (containing 150 ppm of total hardness) would pass through the softener, and the effluent from the softener would nominally have less than 1 ppm of total hardness. By partially softening the makeup source (i.e. softening removes the hardness) using an ion exchange resin (i.e. water softener), the system yields an overall reduction in the amount of calcium introduced to the cooling water by the makeup. This lower amount would allow for greater cycles of concentration, and a lower total makeup.

Typical evaporative cooling systems include a water level control employing a float valve or an electronic level sensor and a solenoid valve, with the float valve/sensor/solenoid-valve device(s) being located outdoors at the cooling tower itself. Known systems that locate these devices outdoors do this despite the fact that the installation of such devices to partially purify (i.e. soften) the water in an outdoor environment is more complex and expensive than an indoor installation. If a water softener device is used in the above "typical" system is located inside, then the "typical" system (using traditional thinking) would require a substantial amount of piping and wiring (and expense) to tie into the (distant) makeup piping and (remote) cooling tower, which includes routing concerns, and safety and construction concerns/requirements.

Apparatus and methods are desired for cooling systems to simplify installations and constructions, reduce installation costs and construction costs, and improve an ability to maintain, service, and check on water softening equipment used, as well as optimizing the system to maximize cycles of concentration of system water prior to the need to dump mineral-laden system water and replace it (and concurrently, minimize the amount of water sent to drain).

SUMMARY OF THE PRESENT INVENTION

In one aspect of the present invention, an apparatus includes an open recirculating cooling system having recirculating system water therein, a blowdown system operably connected to the cooling system for periodically draining an amount of the system water from the cooling system when the system water is overloaded with one or both of minerals and impurities, and an unsoftened makeup water source and a softened makeup water source each operably connected to one of the cooling system and the blowdown system for adding makeup water back into the system water. The apparatus further includes a water meter generating a signal indicating the amount of system water discharged to a drain, and a controller operably connected to the water meter and to the softened makeup water source. The controller is programmed to proportionately add to the system water an amount of the softened makeup water based on cycles of concentration of the system water and also based in part on the signal indicating the amount of system water drained from the cooling system.

In another aspect of the present invention, an apparatus includes an open recirculating cooling system having primary lines for recirculating system water therein, a secondary side circuit with a water filtering device and secondary lines extending from the filtering device to and from the primary lines, and a softened makeup water source operably connected to the secondary side circuit for adding makeup water to the system water. The apparatus further includes a controller operably connected to the softened makeup water source that is programmed to proportionately add to the system water an amount of the softened makeup water based at least in part on cycles of concentration of the system water.

In a narrower aspect of the present invention, the apparatus further includes a drain and a water meter on the secondary lines extending to the drain, and the controller is programmed for control based in part on a signal from the water meter indicating a volume of system water sent to drain from the cooling system.

In a narrower aspect of the present invention, the apparatus further includes a sensor generating a conductivity signal indicating concentration of minerals in the system water, and the controller is connected to the sensor to receive the conductivity signal and to control or stop addition of the softened water to the system water if the conductivity signal is not within a desired limit.

In another aspect of the present invention, a cooling apparatus for a multi-story building comprises an open recirculating cooling system having recirculating system water therein and that includes a cooling tower located on a building upper floor or roof, a chiller located in or adjacent a building lower floor, and lines extending between the building upper and lower floors for directing flow of the recirculating system water, and includes a softened makeup water source operably connected to the lines at a location adjacent the chiller for adding makeup water to the system water. The apparatus further includes a controller operably connected to the open recirculating cooling system and to the softened makeup water source and that is programmed to proportionately add to the system water an amount of the softened makeup water based at least in part on cycles of concentration of the system water.

In another aspect of the present invention, an improvement is provided for an open tower-based recirculating cooling system having system water therein and having a secondary system operably connected to the cooling system for treating system water and/or draining an amount of system water from the cooling system when the system water is overloaded with minerals and/or impurities and further having an unsoftened makeup water source operably connected to the secondary system. The improvement includes a softened makeup water source operably connected to the cooling system, and a controller operably connected to the cooling system and to the softened makeup water source and that is programmed to proportionately add into the system water some softened makeup water based on cycles of concentration of the system water and based at least in part on a volume of system water drained from the cooling system.

In another aspect of the present invention, a method of providing makeup water to a cooling tower water system having a primary circuit for recirculating cooling water and a blowdown secondary circuit connected to the primary circuit, comprises steps of controlling addition of softened makeup water into the cooling tower water system by proportionately adding softened makeup water into the blowdown secondary circuit based at least in part on cycles of concentration of the system water.

In still another aspect of the present invention, a method of providing makeup water to a cooling tower water system having a primary recirculating system and a secondary side system for treating recirculating water in the water system, comprises steps of sensing conductivity of the recirculating water in the cooling tower water system and, if acceptable, adding controlled amounts of softened makeup water into the water system by proportionately adding softened makeup water into the secondary side system; but if not acceptable, sending a malfunction signal of low conductivity to an alarm and also stopping addition of the softened makeup water until a problem causing the malfunction signal is addressed.

An object of the present invention is to simplify installation and construction of a partial-purification equipment that provides softened makeup water to a cooling tower system, including positioning the softener equipment and controls inside a building at an easily accessed and protected location. By positioning the equipment in an indoor location, it reduces installation costs and reduces the need for long runs of outdoor piping and control wires to the outdoor makeup line/cooling tower.

An object of the present invention is to control an injection of purified makeup water by means of an electronic signal from a water meter on the blowdown line of a cooling system and the proportional actuation of the automatic valve on the inlet or outlet piping of the purification device (i.e. the water softener).

An object of the present inventions to provide a method calling for sensing the conductivity of the cooling water, and then preventing the inlet (or outlet) valve from opening should the conductivity fall below a preset limit, as part of a safety against equipment malfunction.

These and other aspects, objects, and features of the present invention will be understood and appreciated by those skilled in the art upon studying the following specification, claims, and appended drawings.

DETAILED DESCRIPTION OF PREFERRED EMBODIMENTS

The present apparatus includes an open recirculating cooling system (illustrated to include a cooling tower) having recirculating system water therein, a secondary system (e.g. a filtration system) with blowdown system operably connected to the cooling system for periodically draining an amount of the system water from the cooling system when the system water is overloaded with one or both of minerals and impurities, and an unsoftened makeup water source and a softened makeup water source each operably connected to one of the cooling system and the blowdown system for adding makeup water back into the system water. The apparatus further includes a water meter generating a signal indicating the amount of system water discharged to a drain, and a controller operably connected to the water meter and to the softened makeup water source. The controller is programmed to proportionately add to the system water an amount of the softened makeup water based on cycles of concentration of the system water and also based in part on the signal indicating the amount of system water drained from the cooling system. This reduces installation and construction costs considerably by placing the water softener equipment inside the building (near to a chiller) where components are easier to install, service, and maintain, while still resulting in optimal control for purposes of minimizing total makeup water required. This results in a more environmental system with less water usage. Still further, a safety circuit can be used to shut off the system (or at least shut off the blowdown cycle) if conductivity of the system water becomes too low (indicating that there may be a problem overworking or uncontrolled operation of the softener unit).

Figure 1:
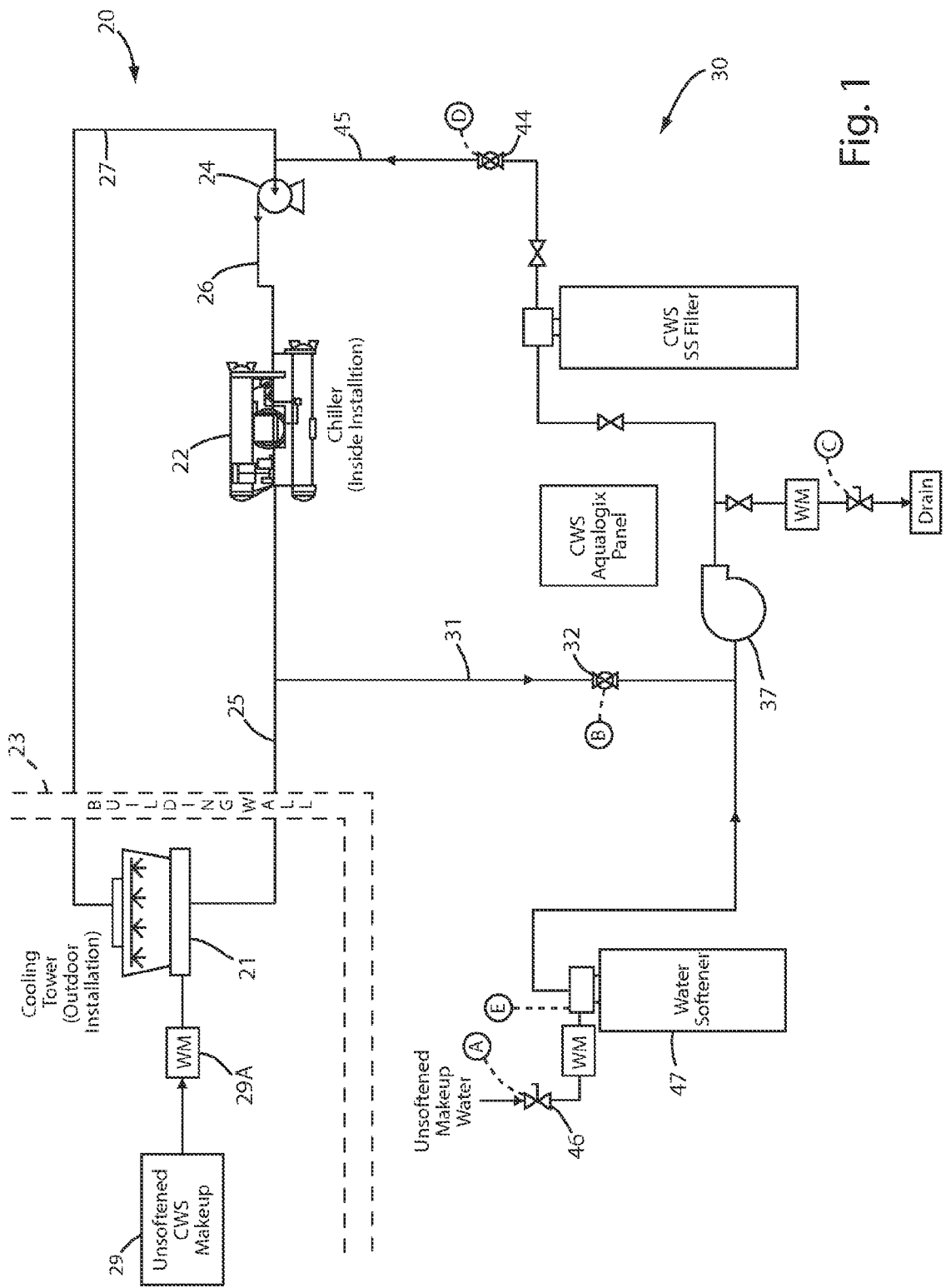
FIG. 1 is a schematic view showing a cooling tower system with cooling tower and chiller, and a blowdown circuit for eliminating and replacing water in the system with partial-softened water.

The illustrated cooling apparatus 20 (FIG. 1) includes a cooling tower 21 installed outdoors (e.g. on a building roof or building upper floor), a chiller 22 installed indoors in a building (i.e. illustrated as a wall 23, the chiller being located at a building lower floor or basement), and a pump 24 for circulating cooling water through primary recirculating lines 25-27 (i.e. pipes) connecting the components 21, 22, 24. Unsoftened chiller makeup water comes from a water source 29 through a water control/feed/meter device 29A and is fed into the apparatus 20 as needed, such as directly into the cooling tower 21.

The following illustrates one particular arrangement to facilitate a discussion of the present innovation, but it is contemplated that a scope of the present innovation is not limited to only the disclosed embodiment, as discussed below. The illustrated secondary system 30 (also called a "sidestream loop" or "subcircuit" herein) is operably connected to the system 20, and includes a water-from-system blowdown feed line 31 connected to the chiller-to-cooling-tower line 25, an isolation solenoid-operated valve 32, a control valve 33, a strainer 34, a pressure gage 35, a conductivity sensor (e.g. sensors 36, 36A), a pump 37, control valves 38, 39, a water supply SS filter 40, a conductivity sensor 41, a pressure gage 42, a control valve 43, an isolation solenoid-operated valve 44, and a water-to-system blowdown return line 45. Additionally, a secondary softened-makeup-water-supply subcircuit includes a connection to the water source 29 for receiving unsoftened makeup water, a solenoid operated valve 46, a water softener 47, a conductivity sensor 48, and a line 49 connected to the blowdown feed line 31 ahead of the control valve 33 (i.e. on a suction side of pump 37). A drain circuit 50 includes a control valve 51, a water/control/meter device 52, and an automatic blowdown solenoid valve 53 connected to drain 54. A controller 60 is connected to each of the components 32, 35, 36, 37, 40, 41, 42, 44, 46-48, and 53, and includes multiple pipe and control lines such as solenoid control lines and sensor lines A-H.

By feeding purified water in proportion to the blowdown (i.e. the amount of mineral-saturated system water sent to drain), this method provides for controlling the proportion of purified water in the overall makeup. The proportion of the purified water is determined by the equation: B×c×(% of softening). The percentage purification is determined by the equation: ((cycles×concentration of constraining factor in makeup)−upper limit of constraining factor in condenser water))/(cycles×concentration of constraining factor in makeup).

The blowdown water meter 52 provides signal proportional to the flow of water to the drain. The controller 60 opens the automatic valve 46 on the city water to inject softened makeup water in proportion to the blowdown water volume drained. The proportion is defined by the equations:

Proportion of softened water in total makeup=(% softening)×$B$×Cycles.     (1):

(% softening)=((Cycles×$Th_{mu}$)−$Th_{limit}$)/(cycles× $Th_{mu}$) ... where $Th_{mu}$=total hardness of the makeup water, and where $Th_{limit}$=Total hardness, maximum limit in recirculating water     (2):

As an additional safeguard, one or more of the solenoid valves 33, 46 or 53 can be locked out in the event of low conductivity, thus preventing the overfeed of purified softened water into the main water recirculating system. For example, the solenoid valve 46 controlling the water softener inlet could be shut down should conductivity in the recirculating system water go below a given set point.

Notably, the terms "partially-purified" makeup or "softened" makeup water (and devices intended to provide same) as used herein are intended to be broadly construed. The preferred apparatus is shown as using softened water or demineralized water, but it is contemplated that a scope of the present innovation includes the use of other purification devices, such as may be required at a particular installation and due to a particular makeup water source.

The present innovation provides several advantages. This method greatly simplifies the installation of a water-saving program for open recirculating cooling loops. Also, this method greatly reduces the cost of installation of a water-savings program for open recirculating cooling loops (new and/or existing installations) by reducing the need for long runs of water lines and/or control wires. This method also improves the accuracy of the percentage of partially-purified makeup that is maintained in the total makeup to the cooling system. This method also removes the purification system from the makeup system to the cooling system, which improves overall reliability of delivering makeup to the open recirculating cooling system. Still further, this method avoids the need for outside installation of the partial-purification system (e.g. water softener) in the case where the makeup system is outside. Yet further, this method avoids the need to modify the makeup control system for the open recirculating cooling system, which can provide significant savings in material and labor. Also, the system reduces total water consumption by increasing efficiency (i.e. increasing the cycles of concentration before mineral concentrations exceed acceptable limits), thus reducing total volume of waste water sent to drain, thus reducing environmental impact.

Figure 2:
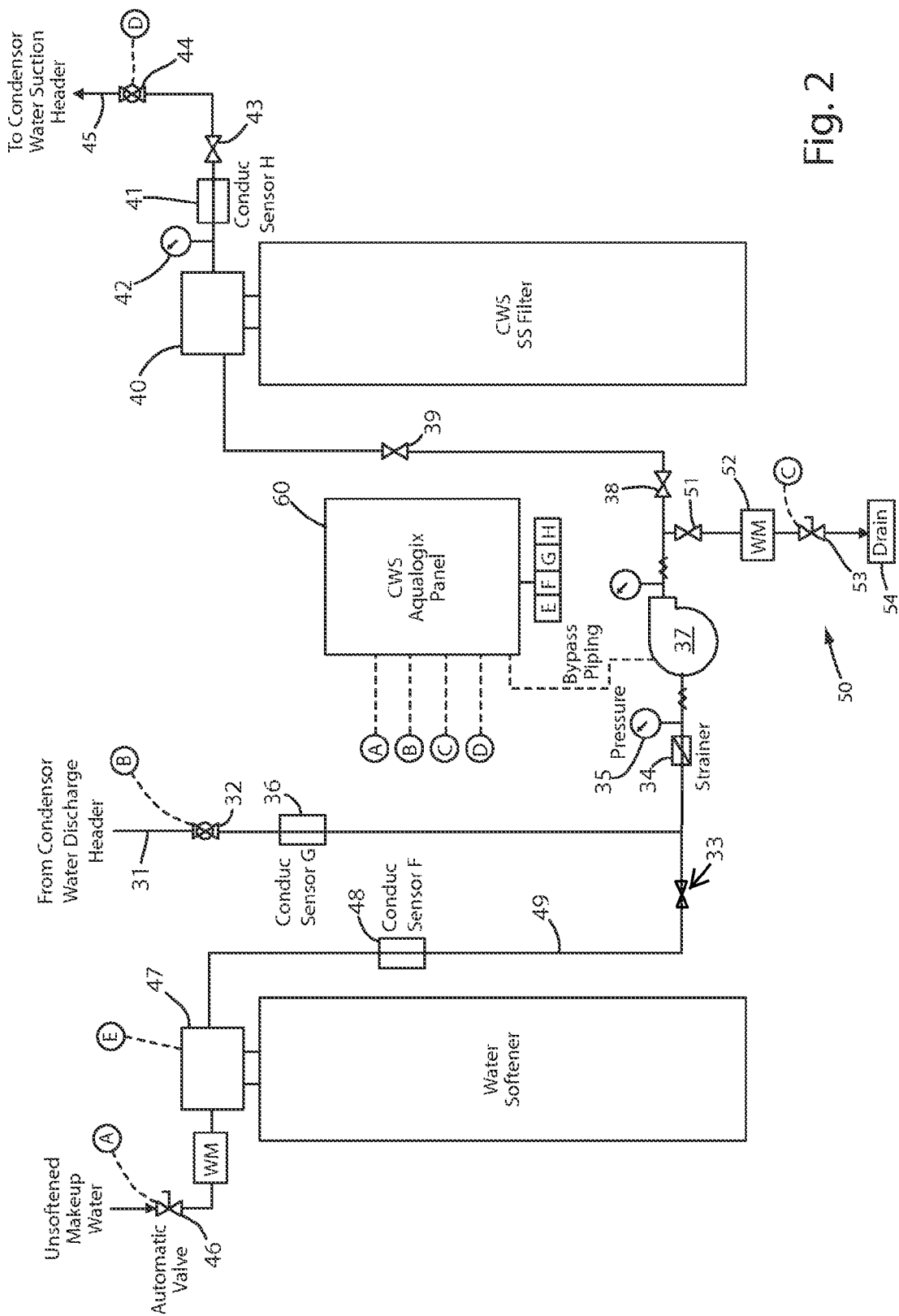
FIG. 2 is a schematic view similar to FIG. 1 but showing increased details of the blowdown circuit.
Figure 3:
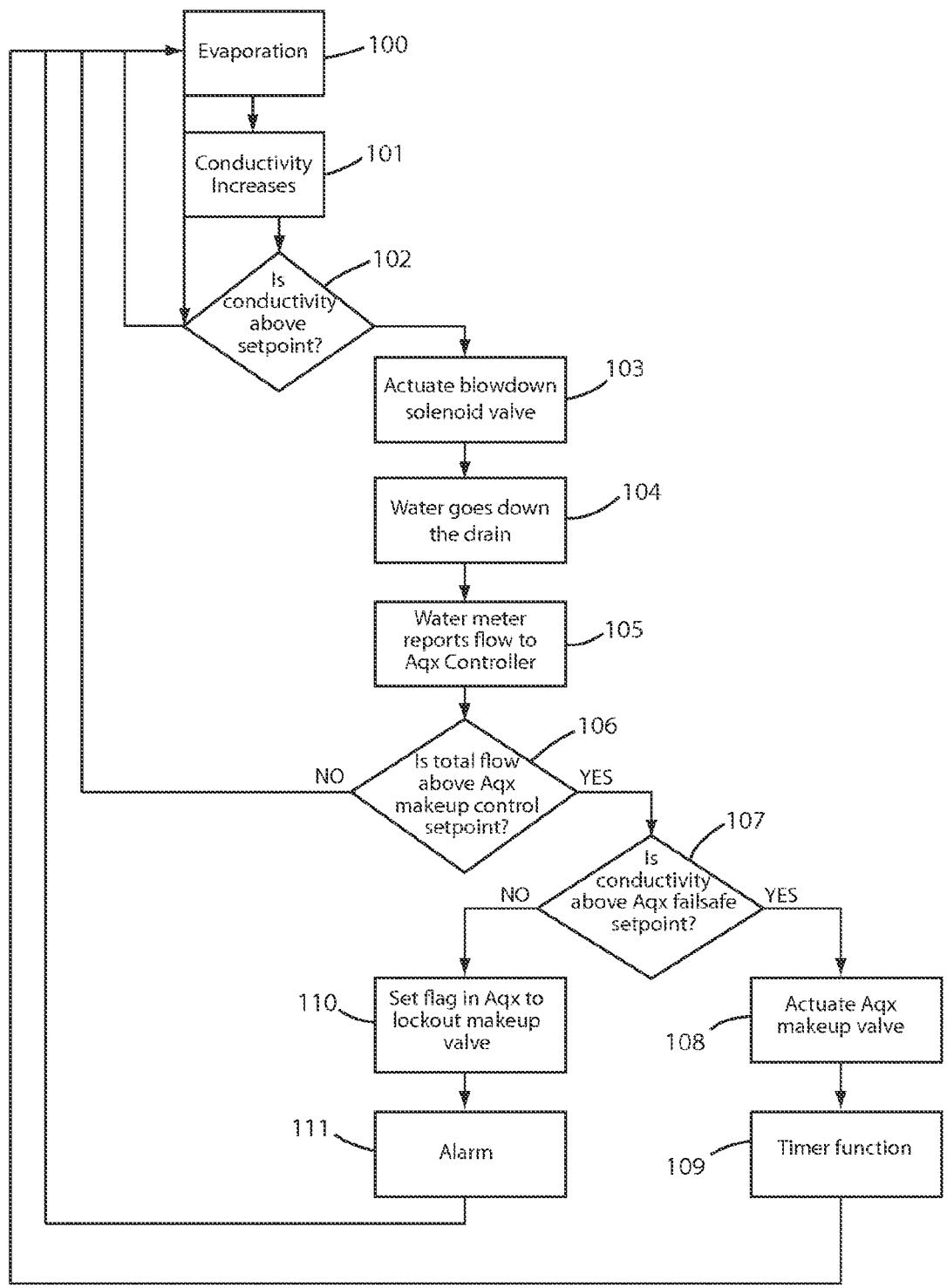
FIG. 3 is a flow chart showing a method of operating the system of FIGS. 1-2.

The preferred system disclosed above is a batch system where some recirculating water is removed via blow down, and then in a later second step, partially-softened water is added back in along with co-proportioned unsoftened makeup water added into the secondary system. Specifically, in the illustrated "partial-softening of makeup" schematic (FIGS. 2-3), the water softener output joins the bypass circuit on a suction side of the side stream booster pump ... and both flow into the side stream booster pump ... and the pressurized output from the side stream booster pump flows selectively to drain or to the CWS SS Filter (and then back into the main recirculation system). This requires a batch blowdown system, where the water softener output does not flow when the bypass water is flowing to drain. (Otherwise, some of the softened makeup water would go to drain.) As illustrated, the steps include (among other steps) actuating a blowdown solenoid (drain) valve (so that) water goes down the drain, and then closing the blowdown solenoid drain valve. The water meter reports flow and conductivity to a controller through sensors, and only then (partially-softened) makeup water is added into/through the blowdown circuit to the unsoftened city makeup water to optimize recirculating water properties/mineral content in the circulating water in the main cooling system. Notably, the illustrated arrangement adds makeup water to the system at two different locations, one being proportionately added softened makeup water into the (return end of) the blowdown sub-circuit, and one being proportional unsoftened makeup water added directly into the system at the cooling tower.

The above system is a batch system. However, it is contemplated that the present innovation can be incorporated into a continuous system via a dynamic process. For example, rather than using a contacting head water meter (where the water meter provides a contact closure every "x" gallons), let's assume that a water meter with a continuous signal (e.g. 4-20 mA output) is used. And, instead of using an ON/OFF valve, assume that a valve that modulates its output with this 4-20 mA signal is used. In this manner, a dynamic control would be achieved. In this case, a user may wish to relocate the softener feed point to the main loop itself (so that they are not blowing down softened water and wasting it). Alternatively, they could use a second booster pump for the softener in order to inject the soft water after the blowdown line (assuming that the makeup water pressure would not be high enough to overcome the condenser water pressure AND the booster pump).

A preferred embodiment (described above) places the makeup water softener and lines inside a building, such as near a chiller and/or a drain or other similar equipment, and controls the process on a sidestream loop (also called a "secondary side system", which is shown as being a partial water filtering system typically placed close to the chiller). However, it is contemplated that the present innovative concepts could also be used on the main loop itself. For example, this would be the case if a sidestream filter is not used. This variation could be accomplished by putting the softener effluent to the low-pressure side of the main loop (e.g. the suction side of the main recirculation pumps), or by using a booster pump for the softener. It is unlikely that one would allow the recirculating water to operate at a maximum concentration (i.e. highest possible cycles) without filtering the water. However, it may be the case that one might position their sidestream filter outside (proximate to the towers themselves). In such case, it is contemplated that one could partially soften the water on the main loop (as opposed to the sidestream), as described above.

A flow chart (FIG. 3) illustrates the present method of using the above system 20. The method includes a step 100 where evaporation occurs in the main water of the system. This causes conductivity to increase (step 101) as minerals and impurities concentrate in the remaining water. When the conductivity rises above a setpoint (step 102), the controller 60 actuates the blowdown cycle, first by actuating the blowdown solenoid valve (step 103) causing water to go down the drain (step 104). The water meter reports the flow to the controller 60 (step 105). If the total flow is above the makeup control setpoint (step 106), the controller 60 checks to see if the conductivity of the main system's water is above the fail safe set point (step 107). If the conductivity is okay, the controller 60 actuates a makeup valve (in step 108) and a timer function (in step 109) thus controlling a length of time (and hence volume of) softened water is added. If the controller 60 finds that the fail safe set point is violated (step 107), then the controller 60 sets a flag (step 110) and notifies a system operator via an alarm (step 111) (and/or stops the addition of softened makeup water into the system until the problem is resolved/addressed).

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An apparatus comprising:
   an open recirculating cooling system having recirculating system water therein;
   a blowdown system operably connected to the cooling system for periodically draining an amount of the system water from the cooling system when the system water is overloaded with one or both of minerals and impurities;
   an unsoftened makeup water source and a softened makeup water source each operably connected to one of the cooling system and the blowdown system for adding makeup water back into the system water;
   a water meter generating a signal indicating the amount of system water discharged to a drain; and
   a controller operably connected to the water meter and to the softened makeup water source and that is programmed to proportionately add to the system water an amount of the softened makeup water based on cycles of concentration of the system water and also based in part on the signal indicating the amount of system water drained from the cooling system.

2. The apparatus defined in claim 1, wherein the softened makeup water source includes a water softener device.

3. The apparatus defined in claim 2, wherein the open recirculating cooling system includes a cooling tower, a chiller, main lines circulating the system water between the cooling tower and the chiller, and includes a secondary circuit connected to the main lines, the secondary circuit being located adjacent the chiller and including a water filtering device and further including the blowdown system.

4. The apparatus defined in claim 1, including a sensor connected to the cooling system and to the controller for shutting down some or all of the blowdown system if the system water generates an unacceptably low conductivity.

5. An apparatus comprising:
   an open recirculating cooling system having primary lines for recirculating system water therein;
   a secondary side circuit with a water filtering device and secondary lines extending from the filtering device to and from the primary lines;
   a softened makeup water source operably connected to the secondary side circuit for adding makeup water to the system water; and
   a controller operably connected to the softened makeup water source and that is programmed to proportionately add to the system water an amount of the softened makeup water based at least in part on cycles of concentration of the system water.

6. The apparatus defined in claim 5, including a drain and a water meter on the secondary lines extending to the drain, and wherein the controller is programmed for control based in part on a signal from the water meter indicating a volume of system water sent to drain from the cooling system.

7. The apparatus defined in claim 5, wherein the open recirculating cooling system includes a cooling tower, a chiller, main lines circulating the system water between the cooling tower and the chiller, and includes a secondary circuit connected to the main lines, the secondary circuit being located adjacent the chiller and including a water filtering device and further including a blowdown system for sending set amounts of mineral-laden system water to drain.

8. A cooling apparatus for a multi-story building comprising:
   an open recirculating cooling system having recirculating system water therein and that includes a cooling tower located on a building upper floor or roof, a chiller located in or adjacent a building lower floor or basement, and lines extending between the building upper and lower floors for directing flow of the recirculating system water;
   a softened makeup water source operably connected to the lines at a location adjacent the chiller for adding softened makeup water to the system water; and
   a controller operably connected to the open recirculating cooling system and to the softened makeup water source and that is programmed to proportionately add to the system water an amount of the softened makeup water based at least in part on cycles of concentration of the system water.

9. In an apparatus for an open tower-based recirculating cooling system having system water therein and having a secondary system operably connected to the cooling system for treating system water and for draining a set amount of the system water from the cooling system when the system water is overloaded with minerals and/or impurities and further having an unsoftened makeup water source operably connected to the cooling system, an improvement for the apparatus comprising:
   a softened makeup water source operably connected to the secondary system; and
   a controller operably connected to the secondary system and to the softened makeup water source and that is programmed to proportionately add into the system water some softened makeup water based on cycles of concentration of the system water and based at least in part on a volume of system water drained from the cooling system.

10. The apparatus defined in claim 9, wherein the open recirculating cooling system includes a cooling tower, a chiller, and main lines circulating the system water between the cooling tower and the chiller, the secondary circuit being connected to the main lines and being located adjacent the chiller and including a water filtering device and further including a blowdown system for sending set amounts of mineral-laden system water to drain.

11. A method of providing makeup water to a cooling tower water system having a primary circuit for recirculating cooling water and a blowdown secondary circuit connected to the primary circuit, comprising steps of:
   controlling addition of softened makeup water into the cooling tower water system by proportionately adding softened makeup water into the blowdown secondary circuit based at least in part on cycles of concentration of the system water.

12. A method of providing makeup water to a cooling tower water system having a primary recirculating system and a secondary side system for treating recirculating water in the primary recirculating system, comprising steps of:
   sensing conductivity of the recirculating water in the cooling tower water system and adding controlled amounts of softened makeup water into the water system to achieve a desired conductivity by proportionately adding softened makeup water into the secondary side system and sending a malfunction signal when low conductivity continues for a set period of time to an alarm and also stopping addition of the softened makeup water until a problem causing the malfunction signal is addressed.

* * * * *